United States Patent
Ishikura et al.

(10) Patent No.: US 7,540,972 B2
(45) Date of Patent: Jun. 2, 2009

(54) MN-ZN BASED FERRITE MATERIAL

(75) Inventors: Tomokazu Ishikura, Tokyo (JP); Shinichi Sakano, Tokyo (JP); Masahiko Watanabe, Tokyo (JP)

(73) Assignee: TDK Corporation, Tokyo (JP)

( * ) Notice: Subject to any disclaimer, the term of this patent is extended or adjusted under 35 U.S.C. 154(b) by 212 days.

(21) Appl. No.: 11/625,853

(22) Filed: Jan. 23, 2007

(65) Prior Publication Data
US 2007/0228319 A1   Oct. 4, 2007

(30) Foreign Application Priority Data
Mar. 30, 2006   (JP) .............................. 2006-093716

(51) Int. Cl.
*H01F 1/34* (2006.01)

(52) U.S. Cl. ................ 252/62.62; 252/62.59; 252/62.63

(58) Field of Classification Search .............. 252/62.62, 252/62.59, 62.63
See application file for complete search history.

(56) References Cited

U.S. PATENT DOCUMENTS 6,905,629 B2 *   6/2005   Sezai et al. .............. 252/62.62

FOREIGN PATENT DOCUMENTS

| JP | 06-310320 | 11/1994 |
|---|---|---|
| JP | 07-130527 | 5/1995 |
| JP | 10-340807 | 12/1998 |

* cited by examiner

*Primary Examiner*—C. Melissa Koslow
(74) *Attorney, Agent, or Firm*—Pearne & Gordon LLP

(57) ABSTRACT

For the purpose of providing a Mn—Zn based ferrite material that is small in magnetic field degradation in high frequency bands of 1 MHz or more, the Mn—Zn based ferrite material includes: as main constituents, $Fe_2O_3$: 53 to 56 mol %, ZnO: 7 mol % or less (inclusive of 0 mol %), and the balance: MnO; and as additives, Co: 0.15 to 0.65% by weight in terms of $Co_3O_4$, Si: 0.01 to 0.045% by weight in terms of $SiO_2$ and Ca: 0.05 to 0.40% by weight in terms of $CaCO_3$; wherein the $\delta$ value (the cation defect amount) defined in the present specification satisfies the relation $3\times10^{-3} \leq \delta \leq 7\times10^{-3}$; and the mean grain size is larger than 8 µm and 15 µm or less.

11 Claims, 7 Drawing Sheets

MN-ZN BASED FERRITE MATERIAL

BACKGROUND OF THE INVENTION

1. Field of the Invention

The present invention relates to a Mn—Zn based ferrite material to be used in cores for, for example, power transformers and suitable for use in high frequency bands of 1 MHz or more, in particular, 2 MHz or more.

2. Description of the Related Art

Recently, the downsizing of electric devices is remarkably developed. Accordingly, power sources mounted in various electric devices are also demanded to be further downsized. In general, when a transformer is driven with a sine wave, the magnetic flux density B is represented by $B=(E_p/4.44N_pAf) \times 10^7$, where $E_p$ represents the applied voltage [V], $N_p$ represents the number of turns of the primary coil, A represents the sectional area of the core [cm$^2$], and f represents the driving frequency [Hz]. As can be seen from the above formula, for the purpose of downsizing transformers, the use of high driving frequencies for the driving frequency is effective; consequently, in these years, demanded are such high performance cores that can be used with high frequencies of the order of a few MHz.

Currently, the Mn—Zn based ferrite material is among the core materials used in the highest proportions for devices such as power transformers. This material is certainly high in permeability in the low frequency bands of the order of 100 kHz and low in loss (core loss) so as to satisfy the significant properties as a core material. However, this ferrite material is remarkably increased in loss for the driving frequencies as high as a few MHz, and hence is hardly used in practical applications in the recent circumstances that the driving frequencies are increasingly becoming higher. In relation to this problem, for example, Japanese Patent Laid-Open Nos. 6-310320 (Patent Document 1) and 7-130527 (Patent Document 2) disclose magnetic materials exhibiting low loss at 300 kHz to a few MHz, these magnetic materials being obtained by adding various oxides as additives to the Mn—Zn based ferrite materials. In this connection, under the claim that these materials are insufficient in the low-loss performance in high frequency bands, Japanese Patent Laid-Open No. 10-340807 (Patent Document 3) discloses a Mn—Co based ferrite material including Fe$_2$O$_3$: 52 to 55 mol %, CoO: 0.4 to 1 mol % and the balance substantially composed of MnO.

[Patent Document 1] Japanese Patent Laid-Open No. 6-310320

[Patent Document 2] Japanese Patent Laid-Open No. 7-130527

[Patent Document 3] Japanese Patent Laid-Open No. 10-340807

SUMMARY OF THE INVENTION

Such a Mn—Zn based ferrite material as described above is usually required to be small in loss, but in some applications, required to be small in magnetic field degradation rather than required to be reduced in loss.

The magnetic field degradation means a phenomenon conspicuous in high frequency bands of 1 MHz or more, in particular, a phenomenon such that application of magnetic field after sintering increases the power loss accompanied with inductance increase. This phenomenon is conceivably ascribed to the variation of the magnetic domain structure caused by the applied magnetic field and the thus caused degradation of the induced magnetic anisotropy.

Such magnetic field degradation as described above is desired to be suppressed as completely as possible because main transformers and choke coils in switching power sources or transformers for power sources are particularly required to be stable.

The present invention has achieved on the basis of these technical problems, and takes as its object the provision of a Mn—Zn based ferrite material small in the magnetic field degradation in the high frequency bands of 1 MHz or more.

The present inventors made a diligent study and consequently found that, for the purpose of suppressing the magnetic field degradation, it is effective to regulate the cation defect amount (δ defined in the following formula (1)) of the Mn—Zn based ferrite material:

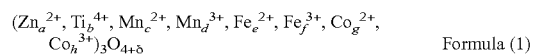

Formula (1)

wherein a+b+c+d+e+f+g+h=3, and δ=a+2b+c+(3/2)d+e+(3/2)f+g+(3/2)h−4 with the proviso that g:h=1:2.

According to the study made by the present inventors, it has been found that, it is advantageous for the cation defect amount δ to fall within a predetermined range, for the purpose of reducing the magnetic field degradation in the high frequency bands of 1 MHz or more, in particular, 2 MHz or more. The present invention is based on this finding, and is a Mn—Zn based ferrite material, which includes: as main constituents, Fe$_2$O$_3$: 53 to 56 mol %, ZnO: 7 mol % or less (inclusive of 0 mol %), and the balance: MnO; and as additives, Co: 0.15 to 0.65% by weight in terms of Co$_3$O$_4$, Si: 0.01 to 0.045% by weight in terms of SiO$_2$ and Ca: 0.05 to 0.40% by weight in terms of CaCO$_3$; wherein the δ value (the cation defect amount) in the above ferrite composition formula (1) satisfies the relation $3\times10^{-3} \leq \delta \leq 7\times10^{-3}$.

Further, the present inventors have found that it is important to regulate the mean grain size of the Mn—Zn based ferrite material to fall within a certain range as well as to control the cation defect amount δ. Specifically, in the present invention, the mean grain size of the Mn—Zn based ferrite material is larger than 8 μm and 15 μm or less.

In the Mn—Zn based ferrite material of the present invention, the δ value preferably satisfies the relation $3\times10^{-3} \leq \delta \leq 5\times10^{-3}$.

Additionally, in the Mn—Zn based ferrite material of the present invention, the power loss thereof is preferably 3000 [kW/m$^3$] or less in the temperature range from room temperature to 125° C. at an excitation magnetic flux density of 50 mT and a measurement frequency of 2 MHz, and the magnetic field degradation rate thereof is preferably 100% or less. The magnetic field degradation rate as referred to herein means the rate of the increase of the power loss immediately after the excitation up to approximately the saturation magnetic flux density relative to the power loss before the excitation, and is represented by

[Pcvr−Pcv]/[Pcv]×100[%]

wherein Pcvr represents the power loss immediately after the excitation (after the magnetic field degradation) and Pcv represents the initial power loss before the excitation.

The present invention can provide a Mn—Zn based ferrite material small in magnetic field degradation in the high frequency bands of 1 MHz or more, and accordingly, can actualize transformers excellent in stability and other like devices.

DETAILED DESCRIPTION OF THE PREFERRED EMBODIMENTS

Figure 1:
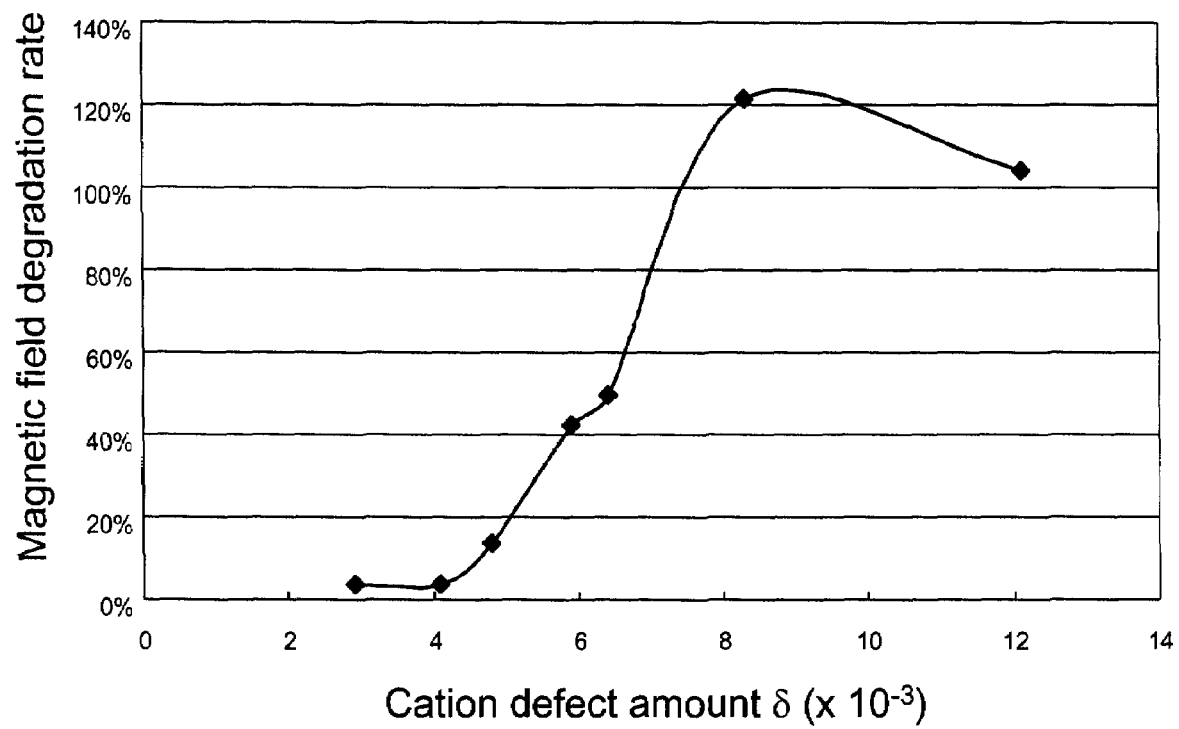
FIG. 1 is a graph showing a relation between a cation defect amount δ and a magnetic field degradation rate.

As described above, the Mn—Zn based ferrite material according to the present invention satisfies the condition that the cation defect amount δ represented by the composition formula (1) falls in a range of $3\times10^{-3} \leq \delta \leq 7\times10^{-3}$. In the high frequency bands of 1 MHz or more, when the cation defect amount δ is less than $3\times10^{-3}$, the loss Pcv at high temperatures becomes large, and additionally, when the cation defect amount exceeds $7\times10^{-3}$, the magnetic field degradation rate becomes large and the stability at the time of application of magnetic field is impaired. In the present invention, the cation defect amount δ falls preferably in a range of $3\times10^{-3} \leq \delta \leq 5\times10^{-3}$, and more preferably in a range of $3\times10^{-3} \leq \delta \leq 4.5\times10^{-3}$.

The cation defect amount δ varies depending on the oxygen partial pressure $PO_2$ at the time of firing, in such a way that the increase of the oxygen partial pressure $P0_2$ can increase the cation detect amount δ.

Additionally, the Mn—Zn based ferrite material according to the present invention satisfies the condition that the particle size thereof (mean grain size) D is lager than 8 μm and 15 μm or less. In the high frequency bands of 1 MHz or more, when the grain size D is 8 μm or less, the magnetic field degradation rate becomes large and the stability at the time of application of magnetic field is impaired, and when the grain size D exceeds 15 μm, the loss Pcv at high temperatures becomes large. In the present invention, the grain size D falls preferably in a range of 12 μm≦D≦15 μm and more preferably in a range of 13 μm≦D≦15 μm.

Next, detailed description is made on the reasons for imposing constraints on the composition of the Mn—Zn based ferrite material according to the present invention.

$Fe_2O_3$: 53 to 56 mol %

$Fe_2O_3$ is an essential constituent to be one of the main constituents in the Mn—Zn based ferrite material of the present invention; when the amount of $Fe_2O_3$ is either too small or too large, the loss Pcv at high temperatures becomes large. Accordingly, in the present invention, the amount of $Fe_2O_3$ is set at 53 to 56 mol %, preferably at 53 to 55 mol % and more preferably at 53 to 54 mol %.

ZnO: 7 mol % or less (inclusive of 0 mol %)

ZnO is also one of the main constituents in the Mn—Zn based ferrite material of the present invention. The amount of ZnO can control the frequency properties of the Mn—Zn based ferrite material. In other words, with decreasing amount of ZnO, the loss Pcv in the high frequency bands becomes smaller. When the amount of ZnO exceeds 7 mol %, the loss Pcv in the high frequency bands of 2 MHz or more is degraded, and hence the upper limit of the amount of ZnO is set at 7 mol %. Additionally, when the amount of ZnO is less than 2 mol %, the magnetic field degradation rate becomes larger and the stability at the time of the application of magnetic field is impaired. Accordingly, the amount of ZnO is preferably 2 to 7 mol % and more preferably 5 to 7 mol %.

The Mn—Zn based ferrite material according to the present invention additionally includes an oxide of Mn as one of the main constituents to be the balance in relation to $Fe_2O_3$ and ZnO. As the oxide of Mn, MnO and $Mn_3O_4$ can be used.

The Mn—Zn based ferrite material of the present invention includes the following additives in addition to the main constituents. The optimization of the amounts of these additives controls the loss reduction in the high frequency bands and the temperature properties of the loss.

Co: 0.15 to 0.65% by weight (1500 to 6500 ppm) in terms of $CO_3O_4$

When the amount of Co is too small, the reduction effect of the loss Pcv cannot be attained to a sufficient extent, and hence the lower limit of the amount of Co is set at 0.15% by weight in terms of $Co_3O_4$. Additionally, with increasing amount of Co, the magnetic field degradation rate is increased. Accordingly, the amount of Co is set at 0.65% by weight or less in terms of $Co_3O_4$. The amount of Co is preferably 0.15 to 0.50% by weight in terms of $Co_3O_4$ and more preferably 0.15 to 0.30% by weight in terms of $Co_3O_4$.

Si: 0.01 to 0.045% by weight in terms of $SiO_2$

Si is segregated in the grain boundary and has an effect to increase the grain boundary resistance and to decrease the current loss. This effect provides an effect to reduce the loss in the high frequency bands. For the purpose of attaining this effect, Si is added in an amount of 0.01% by weight or more in terms of $SiO_2$. However, excessive addition of Si induces the abnormal grain growth. Accordingly, the amount of Si is set at 0.045% by weight or less in terms of $SiO_2$. The amount of Si is preferably 0.01 to 0.03% by weight in terms of $SiO_2$ and more preferably 0.01 to 0.02% by weight in terms Of $SiO_2$.

Ca: 0.05 to 0.40% by weight in terms of $CaCO_3$

Ca is segregated in the grain boundary and has an effect to increase the grain boundary resistance and to decrease the current loss and an effect to suppress the abnormal grain growth. For the purpose of attaining these effects, Ca is added in an amount of 0.05% by weight or more in terms of $CaCO_3$. However, excessive addition of Ca increases the loss in the high frequency bands. Accordingly, the amount of Ca is set at 0.40% by weight or less in terms of $CaCO_3$. The amount of Ca is preferably 0.10 to 0.30% by weight in terms of $CaCO_3$ and more preferably 0.10 to 0.20% by weight in terms of $CaCO_3$.

Hereinafter, description is made on a preferable method for preparing the Mn—Zn based ferrite material of the present invention.

As the raw materials for the main constituents, powders of oxides or powders of compounds to be converted into oxides by heating are used. Specifically, for example, a $Fe_2O_3$ powder, a $Mn_3O_4$ powder and a ZnO powder can be used. The mean particle size of each of these raw material powders may be appropriately selected within a range from 0.1 to 3 μm.

The raw material powders for the main constituents are wet mixed, and then calcined. The calcination temperature may be set at 800 to 1000° C., and the calcination may be carried out in an atmosphere of between $N_2$ and air. The stable time of the calcination may be appropriately selected within a time range from 0.5 to 5 hours. After calcination, the calcined body is milled to a mean particle size of, for example, approximately 0.5 to 2 μm. It is to be noted that the raw materials for the main constituents are not limited to those described above, but powders of composite oxides including two or more metals may also be used as the raw materials for the main constituents. By oxidatively roasting an aqueous solution containing, for example, iron chloride and manganese chloride, a powder of a composite oxide containing Fe and Mn can be obtained. This powder may be mixed with the ZnO powder to prepare a mixed raw material of the main constituents. Such a case no more needs any calcination.

The Mn—Zn based ferrite material of the present invention includes the above described additives added in addition to the main constituents. The raw material powders for these additives are mixed with the raw material powder of the main constituents obtained by milling after calcination. However, the raw material powders for these additives may also be mixed with the raw material powders for the main constituents to be thereafter calcined together with the main constituents.

The mixed powder comprising the main constituents and the additives may be granulated into granules for the purpose of smoothly carrying out a subsequent compacting step. The granulation can be carried out by using, for example, a spray dryer. To the mixed powder, an appropriate binder such as polyvinyl alcohol (PVA) is added in a small amount, and the mixture thus obtained is sprayed to be dried with a spray dryer. The particle size of the obtained granules is preferably set at approximately 80 to 200 μm.

The obtained granules are compacted into a desired shape by using a press equipped with a die having a predetermined shape, and the compacted body is subjected to a sintering step. In the sintering, the compacted body is retained in a temperature range from 1050 to 1350° C. for approximately 2 to 10 hours. By regulating the atmosphere of this sintering, in particular, the oxygen partial pressure $PO_2$ at a stable temperature, the cation defect amount δ or the ratio of $Fe^{2+}/Fe$ can be varied. For the purpose of setting the cation defect amount δ to satisfy the relation $3 \times 10^{-3} \leq \delta \leq 7 \times 10^{-3}$, the oxygen partial pressure $PO_2$ at the stable temperature can be set to be approximately 0.1 to 3%, although the appropriate oxygen partial pressure is dependent on the main constituent composition and the sintering temperature.

Additionally, by regulating the stable temperature, the mean grain size of the Mn—Zn based ferrite material can be varied. The increasing of the stable temperature promotes the grain growth and hence can increase the mean grain size. Additionally, with a certain stable temperature, the decrease of the amounts of $SiO_2$ and $CaCO_3$ can promotes the grain growth, and hence the mean grain size can be regulated.

According to the Mn—Zn based ferrite material satisfying such conditions as described above, there can be actualized a material, in which the power loss is 3200 [kW/m³] or less, preferably 3000 [kW/m³] or less, in the temperature range from room temperature to 125° C. at an excitation magnetic flux density of 50 mT and a measurement frequency of 2 MHz, and small in the magnetic field degradation in such a way that the magnetic field degradation rate is 100% or less.

EXAMPLE 1

As the raw materials for the main constituents, a $Fe_2O_3$ powder, a ZnO powder and a MnO powder were prepared, and as the raw materials for the additives, a $Co_3O_4$ powder, a $SiO_2$ powder and a $CaCO_3$ powder were prepared. These raw material powders were weighed out so as to give each of the mixture compositions shown in Table 1. Thereafter, toroidal Mn—Zn based ferrite sintered bodies (cores) were prepared under the following preparation conditions and the sintering conditions (the retention time: 6 hours) shown in Table 1.

Pot for mixing and milling: Stainless steel pot for ball mill was used.
Media for mixing and milling: Steel balls were used.
Mixing time: 16 hours
Calcination temperature and time: 850° C. and 3 hours
Milling time: 16 hours
Compacting: With compacted body density of 3 g/cm³
Sample dimension: T10 shape (a toroidal shape of 20 mm in outside diameter, 10 mm in inside diameter, and 5 mm in height)

[Cation Defect Amount δ]

The cation defect amount δ of each of the sintered bodies obtained as described above was derived with the following method on the basis of the above described composition formula (1).

Specifically, the derivation of the δ value was carried out on the basis of the composition analysis and the quantitative determination of $Fe^{2+}$ and $Mn^{3+}$. In the composition analysis, each of the above sintered bodies was pulverized to be powdery, and then subjected to measurement with a fluorescent X-ray analyzer (Simultic 3530, manufactured by Rigaku Corp.) on the basis of the glass bead method. In the quantitative determination of $Fe^{2+}$ and $Mn^{3+}$, each of the above sintered bodies was pulverized to be powdery, dissolved in an acid, and subjected to a potentiometric titration with a $K_2Cr_2O_7$ solution. The quantitative determination of $Zn^{2+}$, $Ti^{4+}$, $Co^{2+}$ and $Co^{3+}$ was based on the assumption that the amounts of Zn and Ti determined by the composition analysis were exclusively associated with the divalent and tetravalent ion, respectively, and the ratio of divalent Co to trivalent Co was 1:2. The amounts of $Fe^{3+}$ and $Mn^{2+}$ were derived by subtracting the amounts of $Fe^{2+}$ and $Mn^{3+}$ obtained by the above potentiometric titration from the amounts of Fe and Mn determined by the composition analysis, respectively.

[Initial Loss (Pcv)]

Each of the toroidal sintered bodies obtained as described above was wound with a copper wire to form a 3-turn primary coil and a 3-turn secondary coil, and was subjected to measurement of the initial loss (Pcv) by using a B—H analyzer (SY-8217, manufactured by Iwasaki Tsushinki Co., Ltd.), with the excitation magnetic flux density (Bm) ranging from 25 to 125 mT and the measurement frequency (f) being set at 2 MHz; the measurement was carried out in a thermostatic chamber.

[Loss After Magnetic Field Degradation (Pcvr)]

Successively, a direct electric current of 500 A/m was flowed through the copper wires wound around the above described sintered body to apply a direct current magnetic field to the sintered body.

The magnetic field degradation was caused in this way, and then the loss after magnetic field degradation (Pcvr) was measured in the same manner as described above.

Thus, the magnetic field degradation rate was derived on the basis of the following formula:

[loss after magnetic field degradation (Pcvr)−initial loss (Pcv)]/[initial loss (Pcv)]

Table 1 and FIG. 1 show the results for the cation defect amount δ, the initial loss (Pcv) and the loss after magnetic field degradation (Pcvr). It is to be noted that FIG. 1 shows the magnetic field degradation rate at 125° C. where the excitation magnetic flux density (Bm) was set at 50 mT.

TABLE 1

| Main constituents | | | Additives | | | | | Mean grain size [μm] | Loss before magnetic field degradation at 2 MHz [kW/m³] | | | | |
|---|---|---|---|---|---|---|---|---|---|---|---|---|---|
| Fe$_2$O$_3$ (mol %) | MnO (mol %) | ZnO (mol %) | Ta$_2$O$_5$ (wt %) | SiO$_2$ (wt %) | CaCO$_3$ (wt %) | Co$_3$O$_4$ (wt %) | δ × 10$^{-3}$ | | 25 | 60 | 80 | 100 | 125 [° C.] |
| 54.20 | 41.40 | 4.40 | 0.07 | 0.018 | 0.2 | 0.3 | 2.9 | 8.6 | 1783 | 2080 | 2380 | 2863 | 4883 |
| 53.95 | 43.25 | 2.80 | 0.07 | 0.018 | 0.2 | 0.3 | 4.1 | 8.2 | 1928 | 2010 | 2127 | 2386 | 2976 |
| 53.95 | 43.25 | 2.80 | 0.07 | 0.018 | 0.2 | 0.3 | 4.8 | 8.1 | 1469 | 1480 | 1532 | 1744 | 2368 |
| 53.95 | 43.25 | 2.80 | 0.07 | 0.018 | 0.2 | 0.3 | 5.9 | 8.6 | 1084 | 1019 | 996 | 1083 | 1599 |
| 53.95 | 43.25 | 2.80 | 0.07 | 0.018 | 0.2 | 0.3 | 6.4 | 9.0 | 1161 | 1019 | 958 | 985 | 1316 |
| 54.40 | 45.48 | 0.12 | 0.07 | 0.018 | 0.2 | 0.3 | 8.3 | 8.5 | 1380 | 1093 | 898 | 743 | 658 |
| 54.40 | 45.48 | 0.12 | 0.07 | 0.018 | 0.2 | 0.3 | 12.1 | 8.6 | 1672 | 1329 | 1113 | 918 | 760 |

| Main constituents | | | Loss after magnetic field degradation at 2 MHz [kW/m³] | | | | | Magnetic field degradation rate at 2 MHz [%] | | | | |
|---|---|---|---|---|---|---|---|---|---|---|---|---|
| Fe$_2$O$_3$ (mol %) | MnO (mol %) | ZnO (mol %) | 25 | 60 | 80 | 100 | 125 [° C.] | 25 | 60 | 80 | 100 | 125 [° C.] |
| 54.20 | 41.40 | 4.40 | 2142 | 2361 | 2633 | 3073 | 5067 | 20% | 14% | 11% | 7% | 4% |
| 53.95 | 43.25 | 2.80 | 2253 | 2306 | 2386 | 2573 | 3083 | 17% | 15% | 12% | 8% | 4% |
| 53.95 | 43.25 | 2.80 | 1956 | 1985 | 2025 | 2195 | 2692 | 33% | 34% | 32% | 26% | 14% |
| 53.95 | 43.25 | 2.80 | 1666 | 1701 | 1780 | 1879 | 2273 | 54% | 67% | 79% | 73% | 42% |
| 53.95 | 43.25 | 2.80 | 1673 | 1631 | 1608 | 1669 | 1967 | 44% | 60% | 68% | 69% | 49% |
| 54.40 | 45.48 | 0.12 | 1911 | 1707 | 1574 | 1487 | 1458 | 38% | 56% | 75% | 100% | 122% |
| 54.40 | 45.48 | 0.12 | 2193 | 1932 | 1772 | 1643 | 1551 | 31% | 45% | 59% | 79% | 104% |

As shown in Table 1 and FIG. 1, the larger the cation defect amount δ is, the smaller the loss Pcv tends to be. On the contrary, the magnetic field degradation rate is increased with increasing cation defect amount δ. By adopting the cation defect amount δ of the present invention, the magnetic field degradation rate can be suppressed to be low. As can be seen from these results, the cation defect amount δ falls preferably in a range of $3 \times 10^{-3} \leq \delta \leq 7 \times 10^{-3}$, more preferably $3 \times 10^{-3} \leq \delta \leq 5 \times 10^{-3}$, and further more preferably $3 \times 10^{-3} \leq \delta \leq 4.5 \times 10^{-3}$.

EXAMPLE 2

Sintered bodies were prepared in the same manner as in Example 1 except that the mean grain sizes of the sintered bodies were set as shown in Table 2. The sintered bodies thus prepared were subjected to the same measurements as in Example 1. The results thus obtained are shown in Table 2 and FIG. 2.

Figure 2:
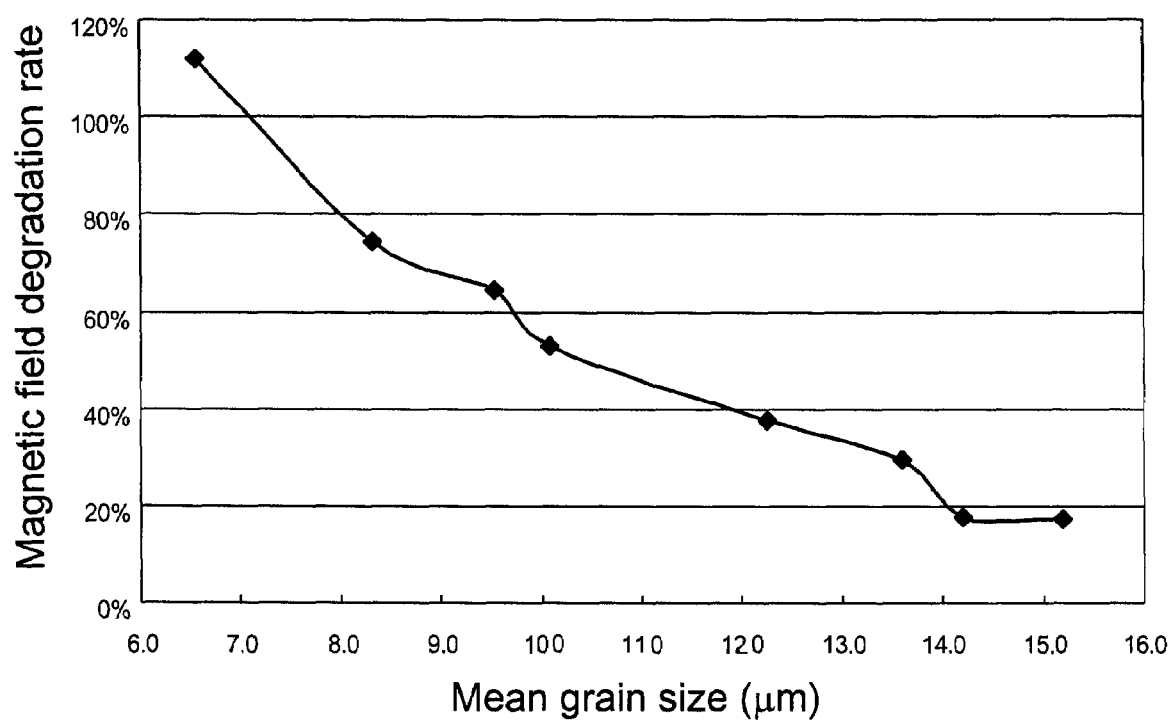
FIG. 2 is a graph showing a relation between a mean grain size and the magnetic field degradation rate.

FIG. 2 shows the relation between the mean grain size and the magnetic field degradation rate at 125° C. As can be seen from Table 2 and FIG. 2, when the mean grain size is 8 μm or less, the magnetic field degradation rate is increased. When the mean grain size exceeds 15 μm, the loss Pcv at high temperatures is increased. As can be seen from these results, the mean grain size is preferably 8 μm or more and 15 μm or less, more preferably 12 μm or more and 15 μm or less and furthermore preferably 13 μm or more and 15 μm or less.

TABLE 2

| Main constituents | | | Additives | | | | | Mean grain size [μm] | Loss before magnetic field degradation at 2 MHz [kW/m³] | | | | |
|---|---|---|---|---|---|---|---|---|---|---|---|---|---|
| Fe$_2$O$_3$ (mol %) | MnO (mol %) | ZnO (mol %) | Ta$_2$O$_5$ (wt %) | SiO$_2$ (wt %) | CaCO$_3$ (wt %) | Co$_3$O$_4$ (wt %) | δ × 10$^{-3}$ | | 25 | 60 | 80 | 100 | 125 [° C.] |
| 53.95 | 44.45 | 1.60 | 0.07 | 0.018 | 0.2 | 0.3 | 6.2 | 6.5 | 655 | 516 | 461 | 475 | 616 |
| 53.95 | 44.45 | 1.60 | 0.07 | 0.018 | 0.2 | 0.3 | 6.4 | 8.3 | 1482 | 1275 | 1137 | 1072 | 1179 |
| 53.95 | 44.45 | 1.60 | 0.07 | 0.018 | 0.2 | 0.3 | 6.2 | 9.5 | 1544 | 1291 | 1123 | 1023 | 1091 |
| 53.95 | 44.45 | 1.60 | 0.07 | 0.018 | 0.2 | 0.3 | 6.2 | 10.1 | 1724 | 1480 | 1305 | 1165 | 1214 |
| 53.95 | 44.45 | 1.60 | 0.07 | 0.018 | 0.2 | 0.3 | 6.5 | 12.2 | 2044 | 1754 | 1533 | 1333 | 1260 |
| 53.95 | 44.45 | 1.60 | 0.07 | 0.018 | 0.2 | 0.3 | 6.3 | 13.6 | 2263 | 1938 | 1690 | 1459 | 1365 |
| 53.95 | 44.45 | 1.60 | 0.07 | 0.018 | 0.2 | 0.3 | 6.1 | 14.2 | 2832 | 2495 | 2236 | 2049 | 1949 |
| 53.95 | 44.45 | 1.60 | 0.07 | 0.018 | 0.2 | 0.3 | 6.3 | 15.2 | 3242 | 2883 | 2576 | 2510 | 2550 |

TABLE 2-continued

| Main constituents | | | Loss after magnetic field degradation at 2 MHz [kW/m$^3$] | | | | | Magnetic field degradation rate at 2 MHz [%] | | | | |
|---|---|---|---|---|---|---|---|---|---|---|---|---|
| Fe$_2$O$_3$ (mol %) | MnO (mol %) | ZnO (mol %) | 25 | 60 | 80 | 100 | 125 [° C.] | 25 | 60 | 80 | 100 | 125 [° C.] |
| 53.95 | 44.45 | 1.60 | 1177 | 1080 | 1047 | 1101 | 1307 | 80% | 109% | 127% | 132% | 112% |
| 53.95 | 44.45 | 1.60 | 1924 | 1849 | 1834 | 1864 | 2057 | 30% | 45% | 61% | 74% | 74% |
| 53.95 | 44.45 | 1.60 | 1920 | 1794 | 1695 | 1679 | 1793 | 24% | 39% | 51% | 64% | 64% |
| 53.95 | 44.45 | 1.60 | 2085 | 1934 | 1836 | 1771 | 1857 | 21% | 31% | 41% | 52% | 53% |
| 53.95 | 44.45 | 1.60 | 2305 | 2081 | 1899 | 1736 | 1732 | 13% | 19% | 24% | 30% | 37% |
| 53.95 | 44.45 | 1.60 | 2512 | 2227 | 2009 | 1810 | 1768 | 11% | 15% | 19% | 24% | 30% |
| 53.95 | 44.45 | 1.60 | 3031 | 2728 | 2501 | 2326 | 2294 | 7% | 9% | 12% | 14% | 18% |
| 53.95 | 44.45 | 1.60 | 3531 | 3118 | 2987 | 2940 | 2993 | 9% | 8% | 16% | 17% | 17% |

EXAMPLE 3

Figure 3:
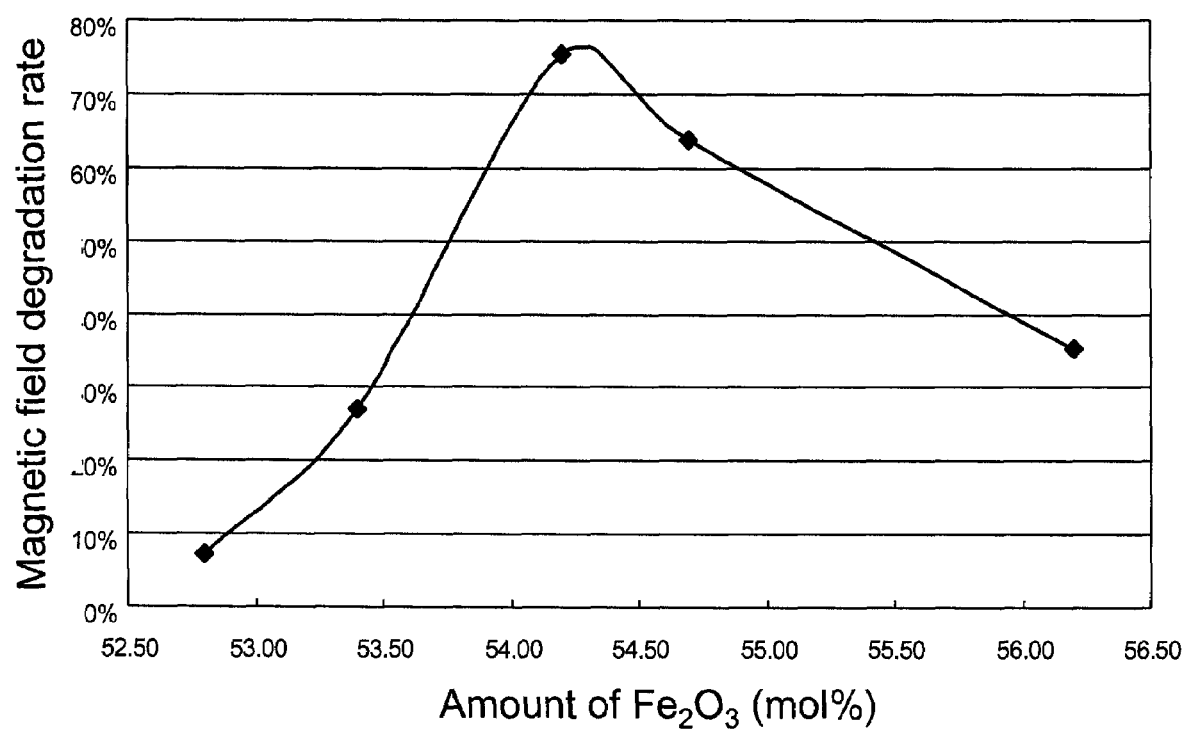
FIG. 3 is a graph showing a relation between the amount of $Fe_2O_3$ and the magnetic field degradation rate.

Sintered bodies were prepared in the same manner as in Example 1 except that the main constituent compositions and the additive compositions were set as shown in Table 3. The sintered bodies thus prepared were subjected to the same measurements as in Example 1. The results thus obtained are shown in Table 3. FIG. 3 shows the relation between the amount of Fe$_2$O$_3$ and the magnetic field degradation rate at 125° C. As can be seen from Table 3 and FIG. 3, when the amount of Fe$_2$O$_3$ is less than 53 mol % or exceeds 56 mol %, the loss Pcv is increased. The amount of Fe$_2$O$_3$ is preferably 53 to 56 mol %, more preferably 53 to 55 mol % and furthermore preferably 53 to 54 mol %.

EXAMPLE 4

Figure 4:
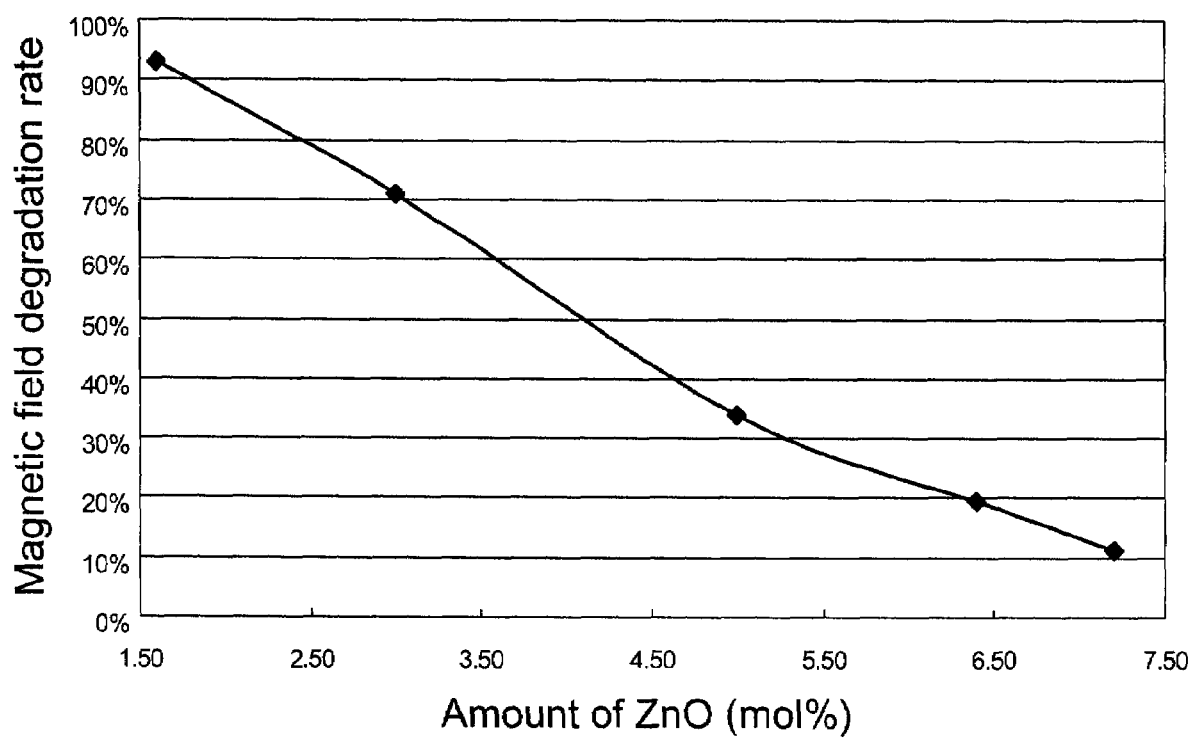
FIG. 4 is a graph showing a relation between the amount of ZnO and the magnetic field degradation rate.

Sintered bodies were prepared in the same manner as in Example 1 except that the main constituent compositions and the additive compositions were set as shown in Table 4. The sintered bodies thus prepared were subjected to the same measurements as in Example 1. The results thus obtained are shown in Table 4. FIG. 4 shows the relation between the amount of ZnO and the magnetic field degradation rate at 125° C. As can be seen from Table 4 and FIG. 4, the increase of the amount of ZnO increases the loss Pcv at high temperatures. For the purpose of attaining the loss Pcv (125° C., 2 MHz, 50 mT) of 3000 kW/m$^3$ or less, the amount of ZnO is required to be 7 mol % or less. However, when the amount of

TABLE 3

| Main consituents | | | Additives | | | | | Mean grain size [μm] | Loss before magnetic field degradation at 2 MHz [kW/m$^3$] | | | | |
|---|---|---|---|---|---|---|---|---|---|---|---|---|---|
| Fe$_2$O$_3$ (mol %) | MnO (mol %) | ZnO (mol %) | Ta$_2$O$_5$ (wt %) | SiO$_2$ (wt %) | CaCO$_3$ (wt %) | Co$_3$O$_4$ (wt %) | δ × 10$^{-3}$ | | 25 | 60 | 80 | 100 | 125 [° C.] |
| 56.20 | 42.20 | 1.60 | 0.07 | 0.022 | 0.2 | 0.3 | 6.3 | 8.1 | 480 | 760 | 1235 | 2540 | 3117 |
| 54.70 | 44.30 | 1.00 | 0.07 | 0.022 | 0.2 | 0.3 | 6.1 | 8.3 | 175 | 269 | 358 | 471 | 703 |
| 54.20 | 44.20 | 1.60 | 0.07 | 0.022 | 0.2 | 0.3 | 6.1 | 8.5 | 643 | 551 | 516 | 536 | 692 |
| 53.40 | 45.00 | 1.60 | 0.07 | 0.022 | 0.2 | 0.3 | 6.3 | 8.5 | 2222 | 2183 | 2166 | 2174 | 2230 |
| 52.80 | 45.60 | 1.60 | 0.07 | 0.022 | 0.2 | 0.3 | 6.3 | 8.3 | 3160 | 3139 | 3236 | 3421 | 3642 |

| Main constituents | | | Loss after magnetic field degradation at 2 MHz [kW/m$^3$] | | | | | Magnetic field degradation rate at 2 MHz [%] | | | | |
|---|---|---|---|---|---|---|---|---|---|---|---|---|
| Fe$_2$O$_3$ (mol %) | MnO (mol %) | ZnO (mol %) | 25 | 60 | 80 | 100 | 125 [° C.] | 25 | 60 | 80 | 100 | 125 [° C.] |
| 56.20 | 42.20 | 1.60 | 1160 | 1670 | 2670 | 3660 | 4215 | 142% | 120% | 116% | 44% | 35% |
| 54.70 | 44.30 | 1.00 | 349 | 513 | 630 | 826 | 1152 | 99% | 91% | 76% | 75% | 64% |
| 54.20 | 44.20 | 1.60 | 941 | 944 | 972 | 1016 | 1214 | 46% | 71% | 89% | 90% | 75% |
| 53.40 | 45.00 | 1.60 | 2612 | 2591 | 2639 | 2704 | 2833 | 18% | 19% | 22% | 24% | 27% |
| 52.80 | 45.60 | 1.60 | 4414 | 3808 | 3645 | 3701 | 3905 | 40% | 21% | 13% | 8% | 7% |

Figure 5:
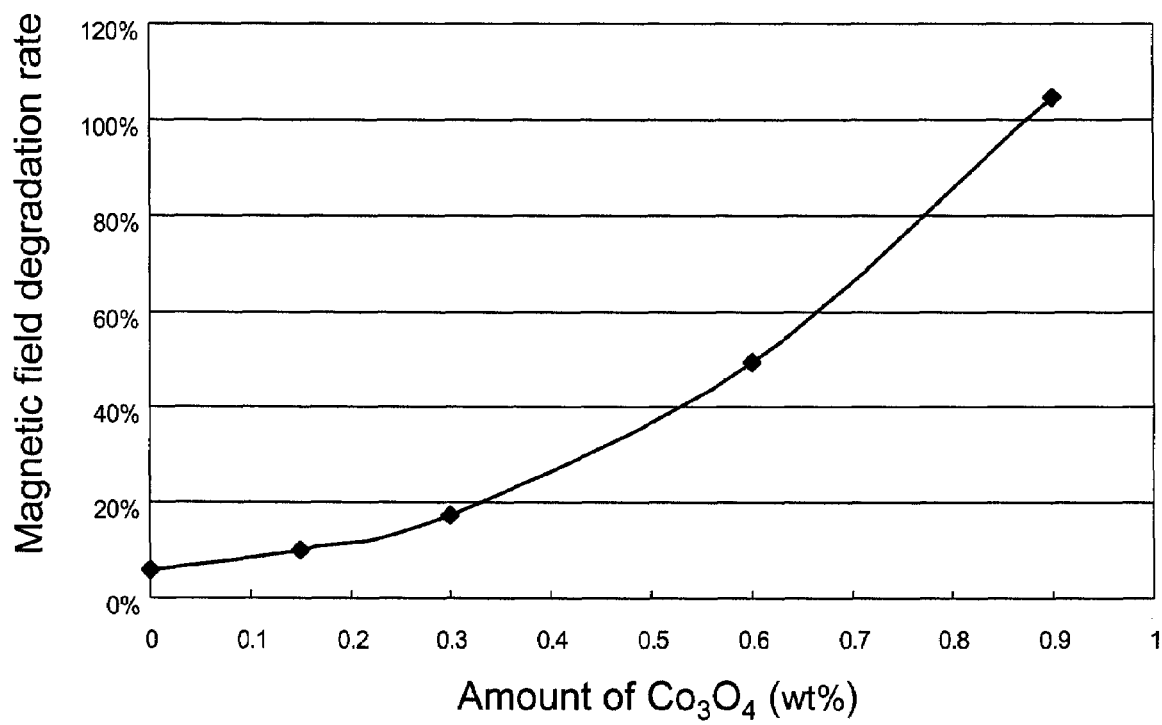
FIG. 5 is a graph showing a relation between the amount of $Co_3O_4$ and the magnetic field degradation rate.

ZnO is decreased, the magnetic field degradation rate is increased. For the purpose of reducing the magnetic field degradation rate, the amount of ZnO is preferably 2 to 7 mol % and more preferably 5 to 7 mol %.

measurements as in Example 1. The results thus obtained are shown in Table 5. FIG. 5 shows the relation between the amount of $Co_3O_4$ and the magnetic field degradation rate at 125° C. As can be seen from the results shown in Table 5 and

TABLE 4

| Main consituents | | | Additives | | | | | Mean grain size [μm] | Loss before magnetic field degradation at 2 MHz [kW/m³] | | | | |
|---|---|---|---|---|---|---|---|---|---|---|---|---|---|
| $Fe_2O_3$ (mol %) | MnO (mol %) | ZnO (mol %) | $Ta_2O_5$ (wt %) | $SiO_2$ (wt %) | $CaCO_3$ (wt %) | $Co_3O_4$ (wt %) | δ × $10^{-3}$ | | 25 | 60 | 80 | 100 | 125 [° C.] |
| 53.95 | 44.45 | 1.60 | 0.07 | 0.018 | 0.2 | 0.3 | 6.2 | 8.8 | 1300 | 1091 | 963 | 891 | 964 |
| 53.95 | 43.05 | 3.00 | 0.07 | 0.018 | 0.2 | 0.3 | 6.4 | 8.5 | 1070 | 940 | 896 | 926 | 1227 |
| 53.95 | 41.05 | 5.00 | 0.07 | 0.018 | 0.2 | 0.3 | 6.5 | 8.7 | 900 | 860 | 909 | 1226 | 1955 |
| 53.95 | 39.65 | 6.40 | 0.07 | 0.018 | 0.2 | 0.3 | 6.6 | 8.3 | 797 | 924 | 1098 | 1467 | 2199 |
| 53.95 | 38.85 | 7.20 | 0.07 | 0.018 | 0.2 | 0.3 | 6.2 | 8.8 | 765 | 1198 | 1610 | 2211 | 3066 |

| Main constituents | | | Loss after magnetic field degradation at 2 MHz [kW/m³] | | | | | Magnetic field degradation rate at 2 MHz [%] | | | | |
|---|---|---|---|---|---|---|---|---|---|---|---|---|
| $Fe_2O_3$ (mol %) | MnO (mol %) | ZnO (mol %) | 25 | 60 | 80 | 100 | 125 [° C.] | 25 | 60 | 80 | 100 | 125 [° C.] |
| 53.95 | 44.45 | 1.60 | 1730 | 1675 | 1670 | 1710 | 1861 | 33% | 54% | 73% | 92% | 93% |
| 53.95 | 43.05 | 3.00 | 1615 | 1666 | 1692 | 1788 | 2099 | 51% | 77% | 89% | 93% | 71% |
| 53.95 | 41.05 | 5.00 | 1473 | 1652 | 1807 | 2069 | 2620 | 64% | 92% | 99% | 69% | 34% |
| 53.95 | 39.65 | 6.40 | 1437 | 1595 | 1744 | 2047 | 2631 | 80% | 73% | 59% | 40% | 20% |
| 53.95 | 38.85 | 7.20 | 1510 | 1901 | 2262 | 2719 | 3410 | 97% | 59% | 40% | 23% | 11% |

EXAMPLE 5

Sintered bodies were prepared in the same manner as in Example 1 except that the main constituent compositions and the additive compositions were set as shown in Table 5. The sintered bodies thus prepared were subjected to the same FIG. 5, the addition of $Co_3O_4$ can decrease the loss Pcv, but the increase of the amount of Co increases the magnetic filed degradation rate. Consequently, the amount of Co is set to be 0.65% by weight or less in terms of $Co_3O_4$. The amount of Co is preferably 0.15 to 0.50% by weight in terms of $CO_3O_4$ and more preferably 0.15 to 0.30% by weight in terms of $Co_3O_4$.

TABLE 5

| Main constituents | | | Additives | | | | | Mean grain size [μm] | Loss before magnetic field degradation at 2 MHz [kW/m³] | | | | |
|---|---|---|---|---|---|---|---|---|---|---|---|---|---|
| $Fe_2O_3$ (mol %) | MnO (mol %) | ZnO (mol %) | $Ta_2O_5$ (wt %) | $SiO_2$ (wt %) | $CaCO_3$ (wt %) | $Co_3O_4$ (wt %) | δ × $10^{-3}$ | | 25 | 60 | 80 | 100 | 125 [° C.] |
| 53.95 | 41.05 | 5.00 | 0.07 | 0.018 | 0.2 | 0 | 6.2 | 8.1 | 3661 | 3349 | 3149 | 3046 | 3156 |
| 53.95 | 41.05 | 5.00 | 0.07 | 0.018 | 0.2 | 0.15 | 6.4 | 8.5 | 2925 | 2651 | 2479 | 2432 | 2852 |
| 53.95 | 41.05 | 5.00 | 0.07 | 0.018 | 0.2 | 0.3 | 6.4 | 8.5 | 1910 | 1708 | 1596 | 1586 | 2015 |
| 53.95 | 41.05 | 5.00 | 0.07 | 0.018 | 0.2 | 0.6 | 6.2 | 8.1 | 1135 | 1023 | 990 | 1026 | 1390 |
| 53.95 | 41.05 | 5.00 | 0.07 | 0.018 | 0.2 | 0.9 | 6.1 | 8.1 | 870 | 740 | 696 | 726 | 1027 |

| Main constituents | | | Loss after magnetic field degradation at 2 MHz [kW/m³] | | | | | Magnetic field degradation rate at 2 MHz [%] | | | | |
|---|---|---|---|---|---|---|---|---|---|---|---|---|
| $Fe_2O_3$ (mol %) | MnO (mol %) | ZnO (mol %) | 25 | 60 | 80 | 100 | 125 [° C.] | 25 | 60 | 80 | 100 | 125 [° C.] |
| 53.95 | 41.05 | 5.00 | 3692 | 3370 | 3173 | 3092 | 3337 | 1% | 1% | 1% | 2% | 6% |
| 53.95 | 41.05 | 5.00 | 3130 | 2969 | 2876 | 2918 | 3137 | 7% | 12% | 16% | 20% | 10% |
| 53.95 | 41.05 | 5.00 | 2261 | 2083 | 2026 | 2056 | 2367 | 18% | 22% | 27% | 30% | 17% |
| 53.95 | 41.05 | 5.00 | 1676 | 1710 | 1732 | 1801 | 2079 | 48% | 67% | 75% | 76% | 50% |
| 53.95 | 41.05 | 5.00 | 1615 | 1666 | 1692 | 1788 | 2099 | 86% | 125% | 143% | 146% | 104% |

EXAMPLE 6

Figure 6:
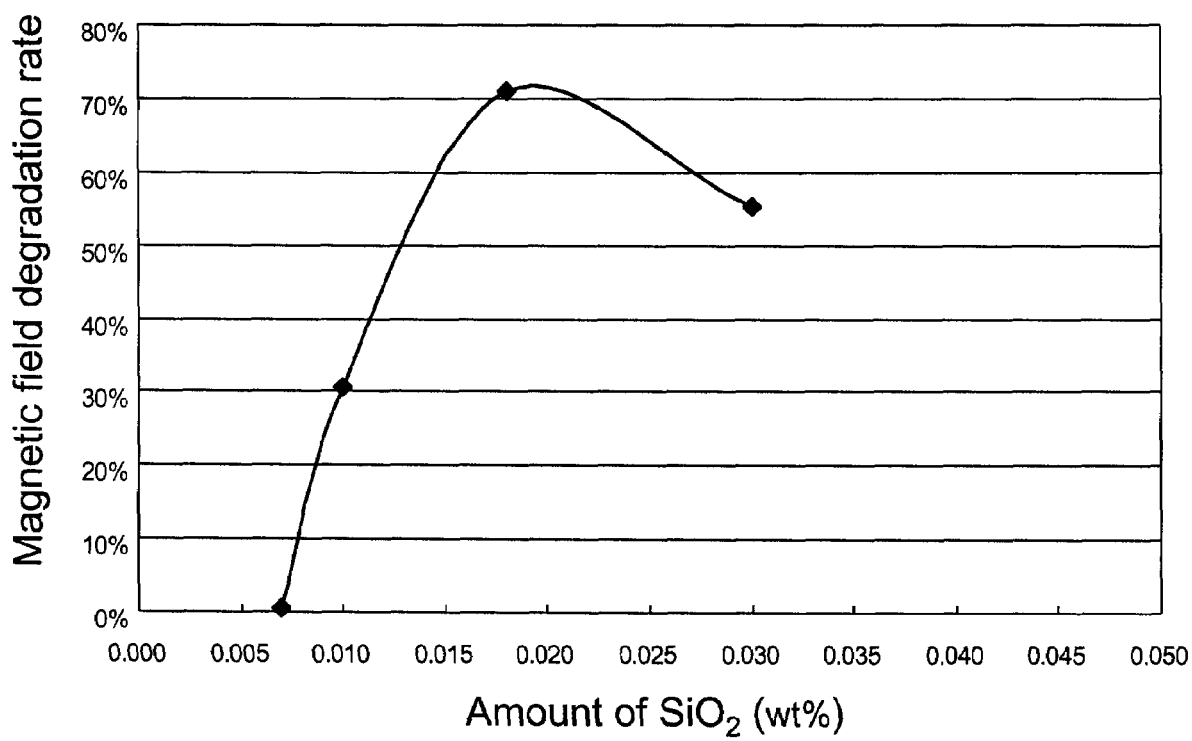
FIG. 6 is a graph showing a relation between the amount of $SiO_2$ and the magnetic field degradation rate.

Sintered bodies were prepared in the same manner as in Example 1 except that the main constituent compositions and the additive compositions were set as shown in Table 6. The sintered bodies thus prepared were subjected to the same measurements as in Example 1. The results thus obtained are shown in Table 6. FIG. 6 shows the relation between the amount of $SiO_2$ and the magnetic field degradation rate at 125° C. As can be seen from the results shown in Table 6 and FIG. 6, the addition of $SiO_2$ can decrease the loss Pcv, but the excessive increase of the amount of Si causes the abnormal grain growth. Consequently, the amount of Si is set to be 0.045% by weight or less in terms of $SiO_2$. The amount of Si is preferably 0.01 to 0.03% by weight in terms of $SiO_2$ and more preferably 0.01 to 0.02% by weight in terms of $SiO_2$.

TABLE 6

| Main consituents | | | Additives | | | | | Mean | Loss before magnetic field degradation at 2 MHz [kW/m³] | | | | |
|---|---|---|---|---|---|---|---|---|---|---|---|---|---|
| $Fe_2O_3$ (mol %) | MnO (mol %) | ZnO (mol %) | $Ta_2O_5$ (wt %) | $SiO_2$ (wt %) | $CaCO_3$ (wt %) | $Co_3O_4$ (wt %) | δ × $10^{-3}$ | grain size [μm] | 25 | 60 | 80 | 100 | 125 [° C.] |
| 53.95 | 43.05 | 3.00 | 0.07 | 0.007 | 0.2 | 0.3 | 6.2 | 9.2 | 2184 | 2531 | 3068 | 3938 | 6505 |
| 53.95 | 43.05 | 3.00 | 0.07 | 0.010 | 0.2 | 0.3 | 6.4 | 8.9 | 1678 | 1465 | 1346 | 1338 | 1761 |
| 53.95 | 43.05 | 3.00 | 0.07 | 0.018 | 0.2 | 0.3 | 6.4 | 8.5 | 1070 | 940 | 896 | 926 | 1227 |
| 53.95 | 43.05 | 3.00 | 0.07 | 0.030 | 0.2 | 0.3 | 6.3 | 8.1 | 1119 | 1095 | 1123 | 1276 | 1816 |
| 53.95 | 43.05 | 3.00 | 0.07 | 0.050 | 0.2 | 0.3 | 6.3 | — | Abnormal grain growth | | | | |

| Main constituents | | | Loss after magnetic field degradation at 2 MHz [kW/m³] | | | | | Magnetic field degradation rate at 2 MHz [%] | | | | |
|---|---|---|---|---|---|---|---|---|---|---|---|---|
| $Fe_2O_3$ (mol %) | MnO (mol %) | ZnO (mol %) | 25 | 60 | 80 | 100 | 125 [° C.] | 25 | 60 | 80 | 100 | 125 [° C.] |
| 53.95 | 43.05 | 3.00 | 3029 | 3384 | 3769 | 4640 | 6544 | 39% | 34% | 23% | 18% | 1% |
| 53.95 | 43.05 | 3.00 | 2053 | 1948 | 1889 | 1921 | 2299 | 22% | 33% | 40% | 44% | 31% |
| 53.95 | 43.05 | 3.00 | 1615 | 1666 | 1692 | 1788 | 2099 | 51% | 77% | 89% | 93% | 71% |
| 53.95 | 43.05 | 3.00 | 1864 | 2019 | 2179 | 2394 | 2819 | 67% | 84% | 94% | 88% | 55% |

EXAMPLE 7

Figure 7:
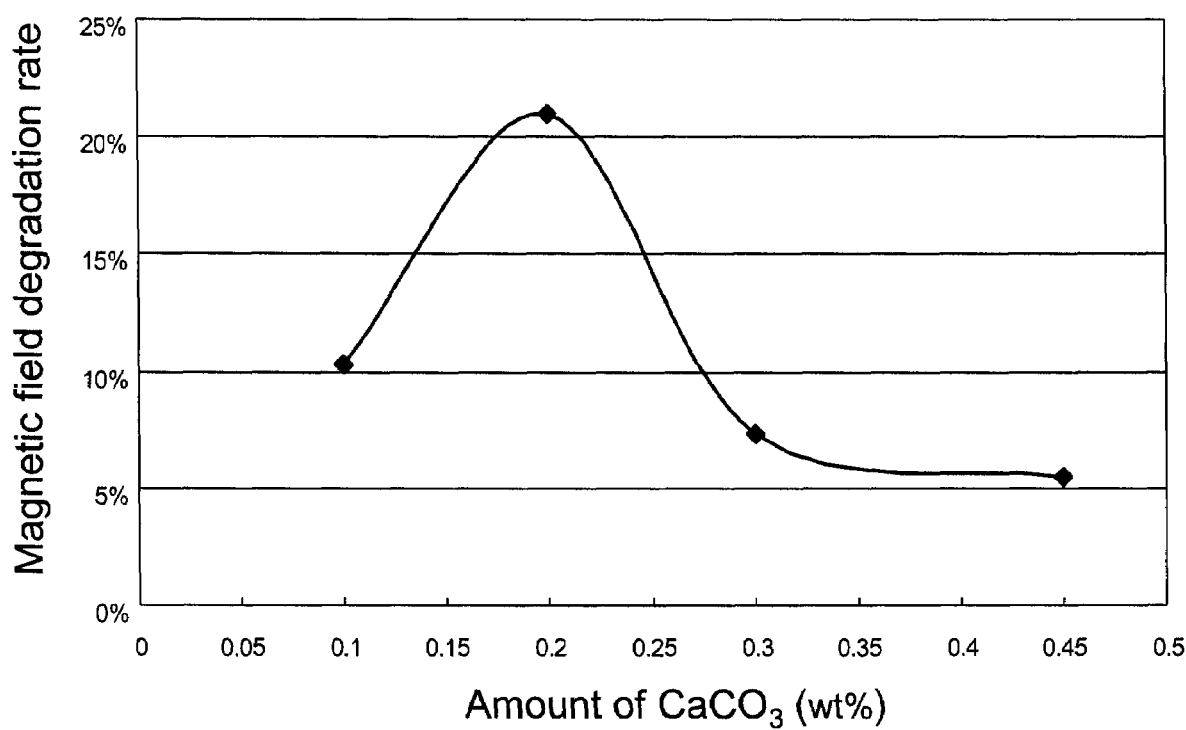
FIG. 7 is a graph showing a relation between the amount of $CaCO_3$ and the magnetic field degradation rate.

Sintered bodies were prepared in the same manner as in Example 1 except that the main constituent compositions and the additive compositions were set as shown in Table 7. The sintered bodies thus prepared were subjected to the same measurements as in Example 1. The results thus obtained are shown in Table 7. FIG. 7 shows the relation between the amount of $CaCO_3$ and the magnetic field degradation rate at 125° C. As can be seen from the results shown in Table 7 and FIG. 7, the addition of $CaCO_3$ can decrease the magnetic field degradation rate, and the amount of $CaCO_3$ set to be 0.05 to 0.40% by weight can attain the loss Pcv of 3200 kW/m³ or less at 125° C and 2 MHz.

The excessive decrease of the amount of $CaCO_3$ causes the abnormal grain growth. Consequently, the amount of Ca is preferably 0.10 to 0.30% by weight in terms of $CaCO_3$ and more preferably 0.10 to 0.20% by weight in terms of $CaCO_3$.

TABLE 7

| Main constituents | | | Additives | | | | $\delta \times 10^{-3}$ | Mean grain size [μm] | Loss before magnetic field degradation at 2 MHz [kW/m³] | | | | |
|---|---|---|---|---|---|---|---|---|---|---|---|---|---|
| Fe₂O₃ (mol %) | MnO (mol %) | ZnO (mol %) | Ta₂O₅ (wt %) | SiO₂ (wt %) | CaCO₃ (wt %) | Co₃O₄ (wt %) | | | 25 | 60 | 80 | 100 | 125 [° C.] |
| 53.95 | 41.05 | 5.00 | 0.07 | 0.018 | 0.025 | 0.3 | 6.1 | Abnormal grain growth | | | | | |
| 53.95 | 41.05 | 5.00 | 0.07 | 0.018 | 0.10 | 0.3 | 6.1 | 9.0 | 1326 | 1425 | 1586 | 1997 | 2861 |
| 53.95 | 41.05 | 5.00 | 0.07 | 0.018 | 0.20 | 0.3 | 6.1 | 8.5 | 786 | 923 | 1102 | 1427 | 2206 |
| 53.95 | 41.05 | 5.00 | 0.07 | 0.018 | 0.30 | 0.3 | 6.1 | 8.1 | 1132 | 1270 | 1490 | 1924 | 2898 |
| 53.95 | 41.05 | 5.00 | 0.07 | 0.018 | 0.45 | 0.3 | 6.1 | 7.6 | 2228 | 2266 | 2387 | 2785 | 3667 |

| Main constituents | | | Loss after magnetic field degradation at 2 MHz [kW/m³] | | | | | Magnetic field degradation rate at 2 MHz [%] | | | | |
|---|---|---|---|---|---|---|---|---|---|---|---|---|
| Fe₂O₃ (mol %) | MnO (mol %) | ZnO (mol %) | 25 | 60 | 80 | 100 | 125 [° C.] | 25 | 60 | 80 | 100 | 125 [° C.] |
| 53.95 | 41.05 | 5.00 | 1640 | 1768 | 1948 | 2358 | 3156 | 24% | 24% | 23% | 18% | 10% |
| 53.95 | 41.05 | 5.00 | 1488 | 1672 | 1834 | 2089 | 2669 | 89% | 81% | 66% | 46% | 21% |
| 53.95 | 41.05 | 5.00 | 1578 | 1725 | 1922 | 2303 | 3109 | 39% | 36% | 29% | 20% | 7% |
| 53.95 | 41.05 | 5.00 | 2389 | 2451 | 2601 | 3011 | 3866 | 7% | 8% | 9% | 8% | 5% |

What is claimed is:

1. A Mn—Zn based ferrite material comprising:
as main constituents,
Fe₂O₃: 53 to 56 mol %;
ZnO: 7 mol % or less (inclusive of 0 mol %); and
the balance: MnO; and
as additives,
Co: 0.15 to 0.65 % by weight in terms of Co₃O₄;
Si: 0.01 to 0.045 % by weight in terms of SiO₂; and
Ca: 0.05 to 0.40 % by weight in terms of CaCO₃;
wherein:
the δ value (the cation defect amount) in the following ferrite composition formula (1) satisfies the relation $3.5 \times 10^{-3} < \delta \leq 7 \times 10^{-3}$; and
the mean grain size is larger than 8 μm and 15 μm or less;
the composition formula (1) being represented as follows:

$$(Zn_a^{2+}, Mn_c^{2+}, Mn_d^{3+}, Fe_e^{2+}, Fe_f^{3+}, Co_g^{2+}, Co_h^{3+})_3 O_{4+\delta}$$  Formula (1)

wherein $a+c+d+e+f+g+h=3$, and $\delta = a +c+(3/2)d+e+(3/2)f+g+(3/2)h-4$ with the proviso that $g:h=1:2$.

2. The Mn—Zn based ferrite material according to claim 1, wherein the δ value satisfies the relation $3.5 \times 10^{-3} < \delta < 5 \times 10^{-3}$.

3. The Mn—Zn based ferrite material according to claim 1, wherein the δ value satisfies the relation $3.5 \times 10^{-3} < \delta \leq 4.5 \times 10^{-3}$.

4. The Mn—Zn based ferrite material according to claim 1, wherein:
the power loss thereof is 3200 [kW/m³] or less in the temperature range from room temperature to 125° C. at an excitation magnetic flux density of 50 mT and a measurement frequency of 2 MHz; and
a magnetic field degradation rate is 100% or less wherein the magnetic field degradation rate is the rate of the increase of the power loss immediately after the excitation approximately up to the saturation magnetic flux density relative to the power loss before the excitation.

5. The Mn—Zn based ferrite material according to claim 1, wherein the amount of ZnO is 2 to 7 mol %.

6. The Mn—Zn based ferrite material according to claim 1, wherein the amount of Co is 0.15 to 0.50% by weight in terms of Co₃O₄.

7. The Mn—Zn based ferrite material according to claim 1, wherein the amount of Si is 0.01 to 0.03% by weight in terms of SiO₂.

8. The Mn—Zn based ferrite material according to claim 1, wherein the amount of Ca is 0.10 to 0.30% by weight in terms of CaCO₃.

9. The Mn—Zn based ferrite material according to claim 1, wherein the amount of Co is 0.15 to 0.30% by weight in terms of Co₃O₄, the amount of Si is 0.01 to 0.02% by weight in terms of SiO₂, and the amount of Ca is 0.1 to 0.2% by weight in terms of CaCO₃.

10. The Mn—Zn based ferrite material according to claim 9, wherein the δ value satisfies the relation $3.5 \times 10^{-3} < \delta < 5 \times 10^{-3}$.

11. The Mn—Zn based ferrite material according to claim 2, wherein:
the power loss thereof is 3200 [kW/m³] or less in the temperature range from room temperature to 125°C. at an excitation magnetic flux density of 50 mT and a measurement frequency of 2 MHz; and
a magnetic field degradation rate is 100% or less wherein the magnetic field degradation rate is the rate of the increase of the power loss immediately after the excitation approximately up to the saturation magnetic flux density relative to the power loss before the excitation.

* * * * *